United States Patent [19]

Ochy P. et al.

[11] Patent Number: 5,555,297
[45] Date of Patent: Sep. 10, 1996

[54] AUTOMATIC CALL DISTRIBUTOR REPORTING SYSTEM AND METHOD THEREFOR

[75] Inventors: Victor V. Ochy P., Woodridge; Jeffrey D. Hodson, Wheaton, both of Ill.

[73] Assignee: Rockwell International Corporation, Seal Beach, Calif.

[21] Appl. No.: 443,500

[22] Filed: May 18, 1995

[51] Int. Cl.$^6$ ............................................. H04M 3/22
[52] U.S. Cl. ...................... 379/136; 379/57; 379/93; 379/112; 379/131; 379/265; 379/201; 379/309
[58] Field of Search ............................... 379/112, 265, 379/57, 58, 111, 88, 63, 116, 118, 122, 127, 142, 136, 133, 131, 128, 56, 93, 309, 201

[56] References Cited

U.S. PATENT DOCUMENTS

| | | | |
|---|---|---|---|
| 4,510,351 | 4/1985 | Costello et al. | 379/112 |
| 4,554,418 | 11/1985 | Toy | 379/88 |
| 4,812,843 | 3/1989 | Champion, III et al. | 379/57 |
| 4,856,047 | 8/1989 | Saunders | 379/57 |
| 5,153,909 | 10/1992 | Beckle et al. | 379/265 |
| 5,260,986 | 11/1993 | Pershan | 379/57 |
| 5,285,494 | 2/1994 | Sprecher et al. | 379/111 |
| 5,299,260 | 3/1994 | Shaio | 379/265 |
| 5,333,183 | 7/1994 | Herbert | 379/112 |
| 5,398,280 | 3/1995 | MacConnell | 379/57 |

*Primary Examiner*—Jeffery Hofsass
*Assistant Examiner*—Scott Wolinsky
*Attorney, Agent, or Firm*—C. B. Patti; S. R. Hewitt

[57] ABSTRACT

An automatic call distributor reporting system (100) and method is provided wherein data reports representative of operation of an automatic call distributor (ACD) (102) are transmitted to a remote electronic display device, such as a pager (120) or telephone (126), over a telephone network (118). The ACD (102) collects data relating to its operation in a well known manner and sends the data to a data reporting system which formats the data for proper transmission by the telephone network (118). The data reporting system comprises a data reporting computer (110) for organizing the data into data reports which are designed for each supervisor. Each report with an unique supervisor identification number is then sent to a remote maintenance computer (112). The remote maintenance computer (112) matches the supervisor identification number with a table in a pager database (116) which contains a table for each supervisor. The old data report is erased from the table and the new data report is entered. Each table also contains a telephonic number used to access the pager (120) or telephone (126) of its corresponding supervisor. The remote maintenance computer (112) transmits the data report in each table to its corresponding supervisor through the telephone network (118) based on the telephonic number stored in the table. Other features are provided which permit a supervisor to activate or deactivate transmission of their data reports and/or to designate a time period in which the supervisor wishes to receive the data reports. A method for transmitting data reports via a telephone network is also provided.

16 Claims, 2 Drawing Sheets

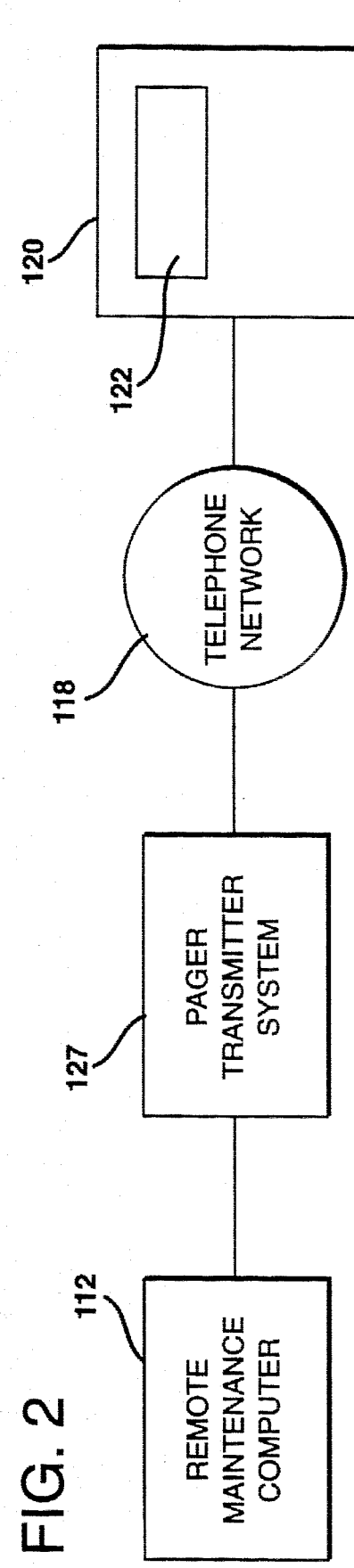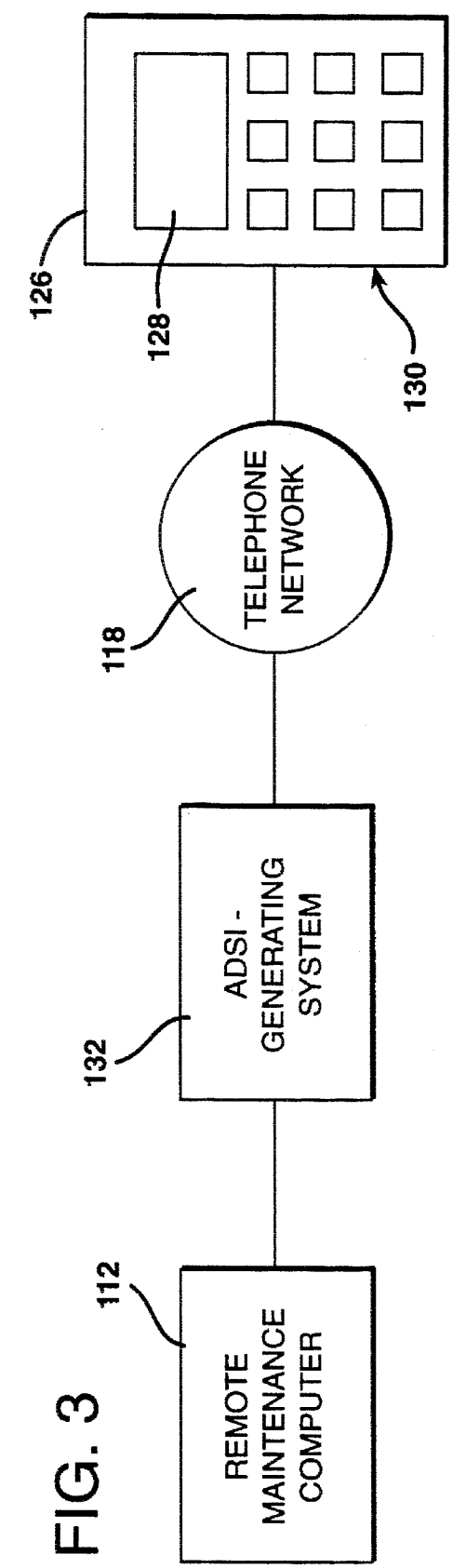

AUTOMATIC CALL DISTRIBUTOR REPORTING SYSTEM AND METHOD THEREFOR

BACKGROUND OF THE INVENTION

The present invention relates generally to an automatic call distribution reporting system and, more particularly, to an automatic call distribution reporting system and method wherein reports are sent via a telephone network to a pager having an electronic display or a telephone having an electronic display.

Automatic call distribution (ACD) systems are increasingly used by businesses to automatically route incoming customer calls to available agents. ACD systems generally include a multiport switch controlled by a central processing unit to interconnect external telephonic units of an external telephonic network with internal telephonic units. An example of such an ACD system is disclosed in U.S. Pat. No. 5,140,611 issued to Jones et al. on Aug. 18, 1992, entitled "Pulse Width Modulated Self-Clocking and Self-Synchronizing Data Transmission and Method for a Telephonic Communication Network Switching System".

ACD systems provide for acquiring, processing and reporting information concerning different aspects of activity within the system. Typically, a data display terminal connected directly, or through a designated LAN network, to the automatic call distributor generates visual representations of the information. Based on this information, management and supervisory personnel are able to evaluate the call activity within the automatic call distributor and, if necessary, make changes for more efficient ACD system operation.

Data is collected on each incoming call offered to the ACD system. This data consists of a log of events occurring in the ACD system over time for an incoming call. Typical logged data elements are receipt of call, call offered to an application, call presented to an agent group and call handled or abandoned. The data representing these data elements is then processed to generate reports for use by management or supervisory personnel. The data may be organized in any number of ways, such as by agent, telephone trunk, agent groups and the like.

These prior reporting systems have somewhat limited reporting capabilities since the supervisor must be positioned at the data display terminal to received the reports. Many times a supervisor is unable to be at the data display terminal and, in fact, the supervisor may be miles away. In such a situation, the supervisor is unable to receive the report until physically viewing the data display terminal or printed reports generated by the data display terminal.

It is thus apparent that a need exists for an automatic call distribution reporting system and method wherein reports are transmitting to management or supervisory personnel at remote locations via remote electronic display devices, such a pager, telephone, or any type of conventional personal communicators.

SUMMARY OF THE INVENTION

This need is met by an automatic call distributor reporting system and method in accordance with the present invention wherein the reports generated by an automatic call distributor (ACD) are transmitted to a remote electronic display device, such as a pager or telephone, of a supervisor over a telephone network.

The ACD reporting system comprises the ACD which collects data relating to its operation in a well known manner. This data is then sent to a data reporting system which formats the data for proper transmission by a telephone network. The data reporting system comprises a data reporting computer which formats the data into data reports individually designed for each supervisor. Each report is then sent, along with a corresponding supervisor number representative of the supervisor who is to receive the data report, to a remote maintenance computer. The remote maintenance computer contains a pager database having a table for each supervisor. Each table includes a unique supervisor identification number corresponding to the supervisor identification numbers generated by the data reporting computer. The remote maintenance computer selects a table by matching the supervisor identification number in the data report to the supervisor identification number contained in one of the tables. The old data report in the matched table is erased from that table and the new data report is entered. Each table also contains a telephonic number used to access a pager or telephone for its corresponding supervisor.

Pager means in the remote maintenance computer then determines whether the ACD reporting system has been activated. Each supervisor individually activates the system to send reports by calling the ACD and entering the appropriate numbers in response to requests by a pager activating means programmed in the ACD. In addition, each supervisor may define a time period during which data reports will be sent to him. The supervisor calls the ACD and enters the appropriate numbers in response to requests by a page scheduling prompter. This information is then sent to the pager database and stored in the supervisor's table. The pager means reads the supervisor's table to determine if the system has been activated for the supervisor. Pager scheduling means also reads the table to determine if it is an accepted time to transmit the data reports. If it is not an accepted time, the pager scheduling means notifies the pager means and no report is sent for the supervisor.

If the supervisor has activated the system and it is within an accepted time, the pager means transmits the data report in the table to the telephone network preferably, by means of a modem. In essence, the modem dials the telephonic number stored in the table. The telephone network connects the pager, or telephone to the remote maintenance computer and the data report is downloaded for display on the pager.

It is thus a feature of the present invention to provide a system and method for automatically transmitting data reports representative of the operation of an automatic call distributor to a remote electronic display device, such as a pager or telephone.

These and other features and advantages of the present invention will become apparent from the following detailed description, the accompanying drawings and the appended claims.

BRIEF DESCRIPTION OF THE DRAWINGS

FIG. 2 is a block diagram representative of a part of an automatic call distributor reporting system which transmits data reports through a pager transmitter system and the telephone network to the remote pager in accordance with another embodiment of the present invention; and FIG. 3 is a block diagram representative of a part of an automatic call distributor reporting system which transmits data reports through a ADSI-generating system and the telephone network to an ADSI telephone in accordance with yet another embodiment of the present invention.

DETAILED DESCRIPTION OF THE INVENTION

Figure 1:
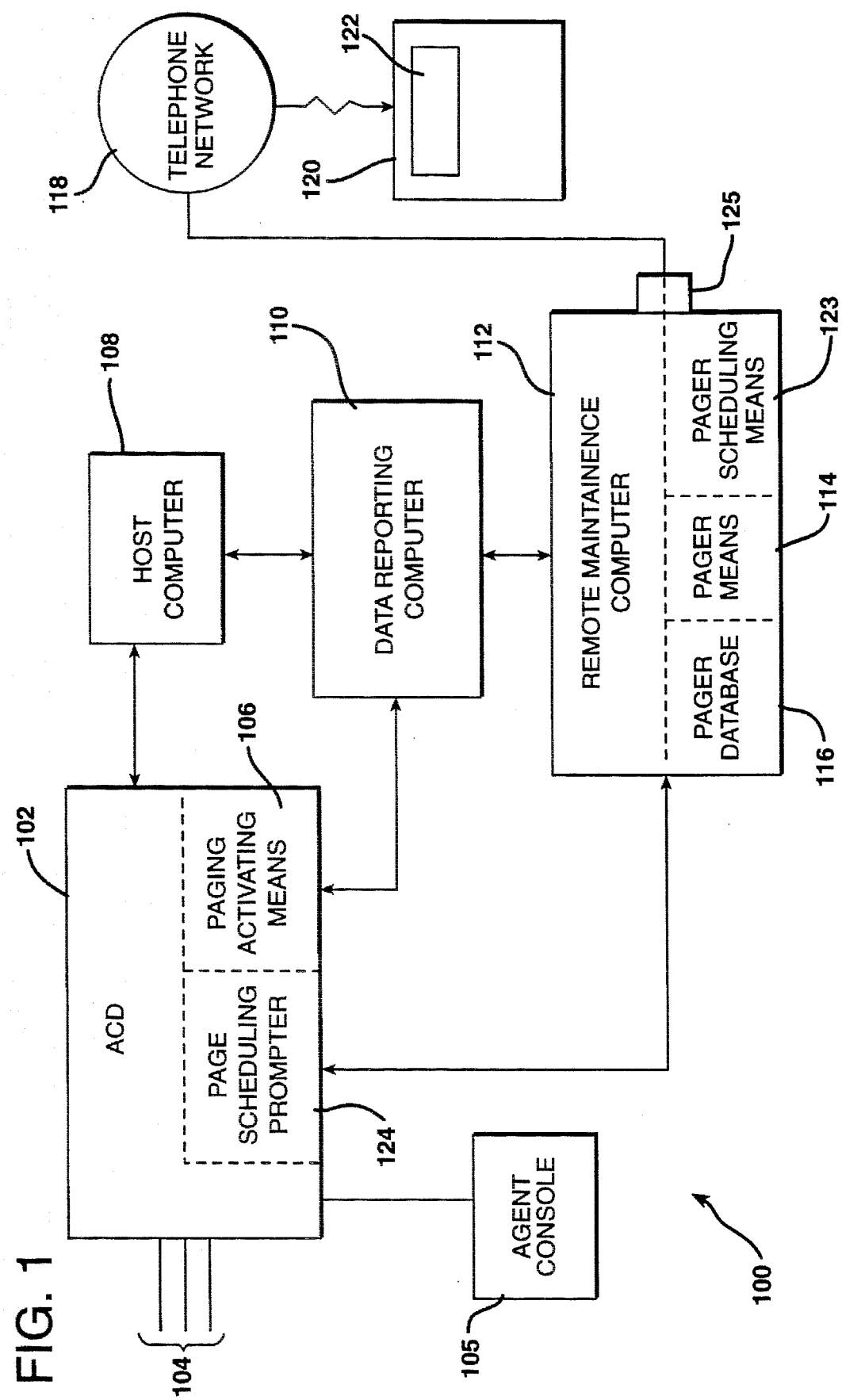
FIG. 1 is a block diagram representative of an automatic call distributor reporting system which transmits data reports to a remote pager through a telephone network in accordance with one embodiment of the present invention.

An automatic call distributor reporting system 100 in accordance with the present invention for transmitting data reports through a telephone network for display on at least one electronic display device is shown in FIG. 1. The automatic call distributor reporting system 100 comprises an automatic call distributor (ACD) 102 which receives incoming telephone calls over telephone lines 104 and routes those telephone calls to appropriate agents positioned at agent consoles 105. The present invention is preferably implemented on a SPECTRUM Automatic Call Distributor manufactured by Rockwell International Corporation of El Segundo, Calif. Those skilled in the art will, however, readily comprehend that the present invention may be advantageously employed in conjunction with other ACD's. Examples of ACDs are disclosed in U.S. Pat. No. 5,268,903, issued to Jones et al., entitled "Multichannel Telephonic Switching Network With Different Signaling Formats and Cross Connect/PBX Treatment Selectable For Each Channel", issued on Dec. 7, 1993 and U.S. Pat. No. 5,140,611, issued to Jones et al., entitled "Pulse Width Modulated Self-Clocking and Self-Synchronizing Data Transmission and Method for a Telephonic Communication Network Switching System", issued on Aug. 18, 1992, the disclosures of which are hereby incorporated by reference.

The ACD 102 comprises paging activating means 106 which activates and deactivates the transmission of reports to each supervisor. The reports are activated and deactivated through commands received through the telephone lines 104. For example, a supervisor or other authorized management individual calls the ACD 102 and accesses a software-based paging vector. The paging vector preferably requests that the caller enter an authorization number and/or a pager number. The paging vector then requests that the caller press the numeral "1" key to activate the reports or the numeral "0" key to deactivate the reports. The software in the ACD 102, including paging, routing and application vectors, may be modified through a host computer 108. The host computer 108 also provides maintenance and administration of the software.

The ACD 102 generates data representative of its operation such as number of calls, number of calls on hold and the like. This data is then stored in the ACD 102 for a designated amount of time. Periodically, copies of the data are downloaded to a data reporting computer 110. Downloading of the data to the data reporting computer 110 is controlled by software in the ACD 102. For example, the data may be downloaded every 30 minutes. The data reporting computer 110 then organizes the downloaded data into data reports which may be presented to a supervisor on a display screen or in printed reports. The contents of the data reports are modified to the requirements of each supervisor. For each data report, the data reporting computer 110 associates a supervisor identification number representative of which supervisor is to receive the data report.

The data reporting computer 110 thereafter transmits the data reports along with their associated supervisor identification number to a remote maintenance computer 112. As should be apparent, the identification number may consist of all numerals, all alpha characters or a combination of both. Pager means 114 in the remote maintenance computer 112 receives the data reports and loads each data report into a table stored in a pager database 116. The pager database 116 is preferably organized into tables for each supervisor. Each table stores a pager number and supervisor identification number for its associated supervisor. The pager means 114 matches the supervisor identification number in the data report with a supervisor identification number stored in one of the tables and loads the data report into the matched table. Before loading a data report into the matched table, the old data report in the table is erased. After loading a data report into a table in the pager database 116, the table preferably contains information for a particular supervisor including the supervisor's identification number, the supervisor's pager number and the data report from the ACD 102. After this information has been thus assembled, the system 100 is ready to transmit the information over a telephone system 118 to a remote electronic display device, such as a pager 120, associated with the supervisor.

Before transmitting the data report to the telephone system 118, the remote maintenance computer 112 determines whether the reports have been activated or deactivated for the particular supervisor. As noted above, a supervisor may call into the ACD 102 and activate or deactivate the reports for their pager 120. When a supervisor deactivates the pager reporting, the ACD 102 sends a message to the remote maintenance computer comprised of the supervisor's identification number and a numeral "0".

The numeral "0" is then stored in that supervisor's table. Thereafter, when the remote maintenance computer 112 accesses the supervisor's table for transmission to the pager 120, the numeral "0" is detected and no data is transmitted. Conversely, if the reports are activated, a numeral "1" is stored in the supervisor's table. The computer 112 detects the numeral "1" and then transmits the information to the telephone network 118.

Pager scheduling means 123 determines when the reports will be sent to the telephone network 118. For example, a supervisor may request that reports be sent to the pager 120 on weekdays between the hours of 7:00 AM and 5:00 PM. To access the scheduling feature, the supervisor would call the ACD 102 as noted above with respect to the paging activating means 106. A page scheduling prompter 124 in the ACD 102 asks the supervisor, for example, to push certain telephone buttons to select specific days and/or hours that the supervisor wishes to receive data reports. It should be understood that such prompts and responses are very well known in the art and are readily implemented by those skilled in the art. Therefore, no additional detail with respect to the paging activating means 106 and page scheduling prompter 124 will be given herein. The selections made by the supervisor are then sent to the remote maintenance computer 112 and stored in the supervisor's table in the pager database 116. The pager scheduling means 123 uses this information to restrict the transmission of reports to the designated time periods.

If the pager reporting is "activated" and it is within the selected time period, the pager means 114 sends the supervisor's pager number and the data report, both which are obtained from the pager database 116, to the telephone network 118. The data report is preferably transmitted to the telephone network 118 by means of a conventional modem 125. The telephone network 118 then accesses the pager 120 and transmits the data report to the pager 120 at the supervisor's pager number in a conventional manner. The data is then displayed on a display 122, such as a conventional liquid crystal display, in a well known manner. The data reporting computer 110 and remote maintenance computer 112, in combination, comprise a data reporting system for receiving data from the ACD 102, for formatting the data for proper transmission through the telephone network 118 to the remote electronic display device and for transmitting the formatted data to the telephone network 118.

An alternative embodiment of the present invention is shown in FIG. 2. Users of ACD's may have a pager transmitter system 127 which formats information for transmission to the telephone network 118. In this case, the information contained in a supervisor's table in the pager database 116 is sent to the pager transmitter system 127 which reorganizes the information for proper transmission to the telephone network 118.

In yet another embodiment of the present invention shown in FIG. 3, an analog digital display services interface (ADSI) telephone 126, is the remote electronic display device which is to receive the data reports. The ADSI telephone 126 includes a display 128 for displaying information and a conventional numerical keypad 130. In order to access the ADSI telephone 126, the data in the supervisor's table is sent to a ADSI-generating system 132 which organizes the data into the ADSI format. The ADSI-generating system 132 and the ADSI telephone 126 are known in the art and will not be further discussed herein.

A method for providing reports representative of operation of an automatic call distributor 102 is provided. The method comprises the steps of acquiring data representative of the operation of the ACD 102; organizing the data for proper transmission over a telephone network 118 to a remote electronic display device; and transmitting the organized data over the telephone network 118 to the remote electronic display device. The step of transmitting the organized data may comprise the step of transmitting the organized data over the telephone network 118 to a pager 120. The step of transmitting the organized data may comprise the step of transmitting the organized data over the telephone network 118 to an ADSI telephone 126.

Preferably, the step of organizing the data comprises the step of associating portions of the data with a telephone number associated with the remote electronic display device. Additionally, the step of transmitting the organized data comprises the step of transmitting the organized data based on the telephonic number. The telephonic number may be a pager number or a telephone number.

Having thus described the invention in detail by way of reference to preferred embodiments thereof, it will be apparent that other modifications and variations are possible without departing from the scope of the invention defined in the appended claims. For example, the software-based devices of the present invention, such as the pager activation means, page scheduling prompter, pager database, pager means and pager scheduling means, may be readily implemented in a number of manners which depart from those described herein.

What is claimed is:

1. An automatic call distributor reporting system for transmitting data reports through a telephone network for display on at least one of a plurality of remote electronic display devices, each of the data reports and each of the remote electronic display devices being associated with at least one of a plurality of supervisors, the system comprising:

an automatic call distributor for routing a plurality of incoming telephone calls to a plurality of agent units and for generating data representative of operation of the automatic call distributor;

a data reporting system for periodically receiving the data from the automatic call distributor, for formatting the data for proper transmission through the telephone network to at least one of the plurality of remote electronic display devices and for transmitting the formatted data to the telephone network for display on at least one of the plurality of remote electronic display devices; and paging activating means in the automatic call distributor for activating and deactivating the transmission of the formatted data from the data reporting system to each individual remote electronic display device.

2. The reporting system as recited in claim 1 wherein the paging activating means selectively activates and deactivates the transmission of the formatted data based on instructions received from a remote supervisor.

3. The reporting system as recited in claim 1 wherein the data reporting system comprises:

a data reporting computer for organizing the data into the data reports, and for associating one of a plurality of supervisor identification numbers with each of the data reports, each of the supervisor identification numbers corresponding to one of the supervisors, and wherein the data reporting system transmits the data reports based on the supervisor identification numbers.

4. The reporting system as recited in claim 3 wherein the data reporting system comprises a remote maintenance computer for receiving the data reports from the data reporting computer, for matching each of the supervisor identification numbers and its associated one of the data reports with one of a plurality of telephonic numbers stored in the remote maintenance computer, each of the telephonic numbers being associated with at least one of the remote electronic display devices and for transmitting each of the data reports to at least one of the remote electronic display devices through the telephone network based on the telephonic numbers.

5. The reporting system as recited in claim 4 wherein the remote maintenance computer comprises a pager database for storing the telephonic numbers, for associating each of the data reports with one of the telephonic numbers and for storing each of the data reports with its associated one of the telephonic numbers.

6. The reporting system as recited in claim 4 wherein the remote maintenance computer comprises pager scheduling means for transmitting each of the data reports and its associated one of the telephonic numbers to the telephone network during a predetermined time period.

7. The reporting system as recited in claim 4 wherein at least one of the telephonic numbers comprises a pager number.

8. The reporting system as recited in claim 4 wherein at least one of the telephonic numbers comprises a telephone number and wherein at least one of the remote electronic display devices is an analog display services interface telephone.

9. A method for providing data reports representative of operation of an automatic call distributor comprising the steps of:

periodically acquiring data representative of the operation of the automatic call distributor;

organizing the data into the data reports for proper transmission over a telephone network to remote electronic display devices;

transmitting each of the data reports over the telephone network to at least one of the remote electronic display devices; and selectively activating and deactivating the transmission of each of the data reports to each individual remote electronic display device.

10. The method as recited in claim 9 wherein the step of transmitting each of the data reports comprises the step of transmitting each of the data reports over the telephone network to at least one pager.

11. The method as recited in claim 9 wherein the step of transmitting each of the data reports comprises the step of transmitting each of the data reports over the telephone network to at least one telephone.

12. The method as recited in claim 9 wherein the step of selectively activating and deactivating the transmission of each of the data reports comprises the step of receiving instructions from a remote supervisor.

13. The method as recited in claim 9 wherein the step of transmitting comprises the step of:

transmitting each of the data reports over the telephone network during a defined time period.

14. The method as recited in claim 9 wherein the step of organizing the data comprises the step of associating each of the data reports with one of plurality of telephonic numbers, each of the telephonic numbers being associated with one of the remote electronic display devices and, wherein the step of transmitting each of the data reports comprises the step of transmitting each of the data reports based on its associated one of the telephonic numbers.

15. The method as recited in claim 14 wherein the step of associating each of the data reports comprises the step of associating each of the data reports with a pager number.

16. The method as recited in claim 14 wherein the step of associating each of the data reports comprises the step of associating each of the data reports with a telephone number.

* * * * *